(12) United States Patent
Dubrenat et al.

(10) Patent No.: US 9,477,130 B2
(45) Date of Patent: Oct. 25, 2016

(54) ELECTROCONTROLLABLE DEVICE

(71) Applicant: SAINT-GOBAIN GLASS FRANCE, Courbevoie (FR)

(72) Inventors: Samuel Dubrenat, Paris (FR); Jia Mei Soon, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 275 days.

(21) Appl. No.: 14/376,797

(22) PCT Filed: Feb. 4, 2013

(86) PCT No.: PCT/FR2013/050231
§ 371 (c)(1),
(2) Date: Aug. 5, 2014

(87) PCT Pub. No.: WO2013/117847
PCT Pub. Date: Aug. 15, 2013

(65) Prior Publication Data
US 2014/0376075 A1    Dec. 25, 2014

(30) Foreign Application Priority Data

Feb. 6, 2012  (FR) .................................... 12 51070

(51) Int. Cl.
| | | |
|---|---|---|
| *G02F 1/153* | (2006.01) | |
| *G02F 1/155* | (2006.01) | |
| *G02F 1/161* | (2006.01) | |
| G02F 1/1339 | (2006.01) | |
| G02F 1/1345 | (2006.01) | |
| E06B 9/24 | (2006.01) | |

(52) U.S. Cl.
CPC ................ *G02F 1/161* (2013.01); *G02F 1/155* (2013.01); *E06B 2009/2464* (2013.01); *G02F 1/1339* (2013.01); *G02F 1/1345* (2013.01)

(58) Field of Classification Search
CPC ......... G02F 1/153; G02F 1/155; G02F 1/157

USPC ........ 359/271; 428/428, 426, 432, 446, 448, 428/689, 699
See application file for complete search history.

(56) References Cited

U.S. PATENT DOCUMENTS

| | | | |
|---|---|---|---|
| 4,310,220 A | 1/1982 | Kuwagaki et al. | |
| 5,379,146 A | 1/1995 | Defendini | |

(Continued)

FOREIGN PATENT DOCUMENTS

| | | |
|---|---|---|
| DE | 28 02 728 | 7/1978 |
| WO | WO 00/52523 | 9/2000 |
| WO | WO 2007/003533 | 1/2007 |

OTHER PUBLICATIONS

International Search Report issued for International Application No. PCT/FR2013/050231, dated May 8, 2013.

*Primary Examiner* — Bumsuk Won
*Assistant Examiner* — Tamara Y Washington
(74) *Attorney, Agent, or Firm* — Pillsbury Winthrop Shaw Pittman LLP

(57) ABSTRACT

An electrically controllable device includes two supported electrodes, each coated with a conductive coating, the two electrodes positioned with respect to one another so that the conductive coatings are facing each other. An electroactive system, sandwiched between, and in contact with, the two electrodes, has an area smaller than that of each of the electrodes to define a peripheral groove over the entire perimeter of the electroactive system. A peripheral seal fills the groove over the entire perimeter of the electroactive system and is entirely in contact with the two electrodes. The contact area between the seal and the first electrode and the contact area between the seal and the second electrode each include a conductive part and a non-conductive part. No conductive part of the contact area between the seal and the first electrode is opposite a conductive part of the contact area between the seal and the second electrode.

20 Claims, 3 Drawing Sheets

(56) References Cited

U.S. PATENT DOCUMENTS

Figure 2A:
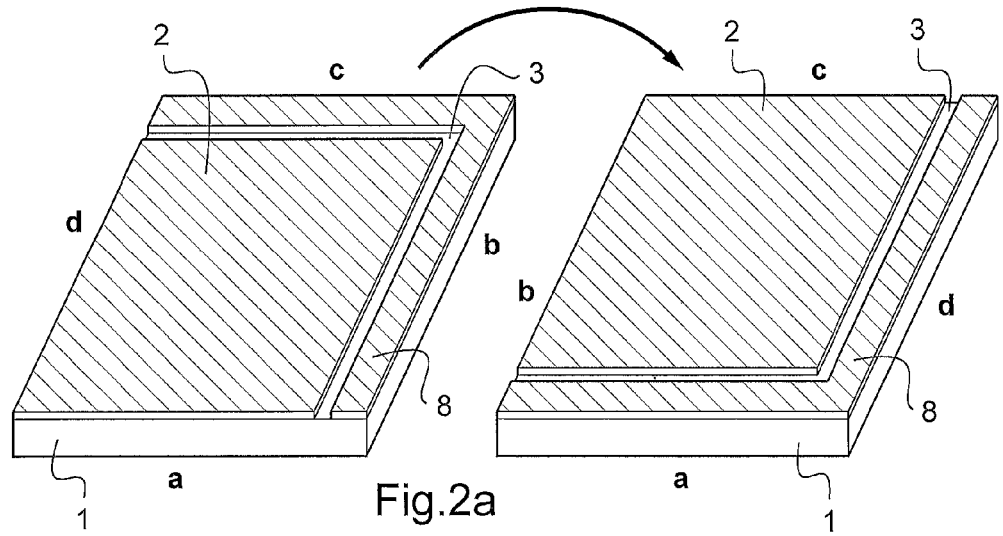
Figure 2B:
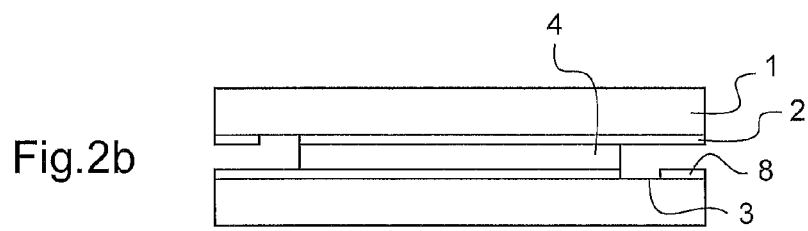
Figure 2C:
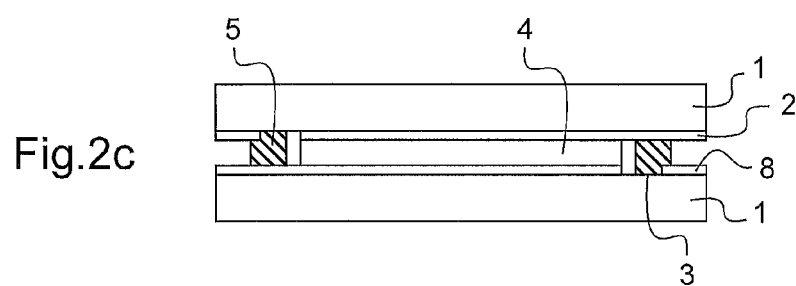
Figure 2D:
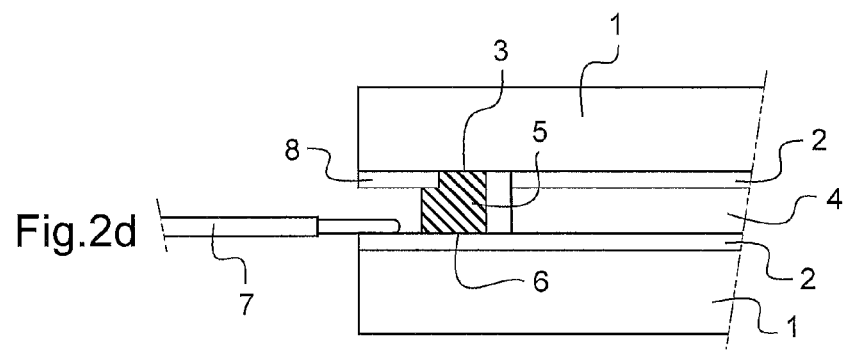

| | | | | |
|---|---|---|---|---|
| 8,693,078 B2* | 4/2014 | Kwak | ................... | G02F 1/1523 359/265 |
| 9,030,724 B2* | 5/2015 | Agrawal | ............... | G02F 1/1506 359/265 |
| 2004/0095631 A1 | 5/2004 | Poll et al. | | |
| 2005/0195488 A1 | 9/2005 | McCabe et al. | | |
| 2009/0181203 A1* | 7/2009 | Valentin | ............ | B32B 17/10036 428/38 |

* cited by examiner

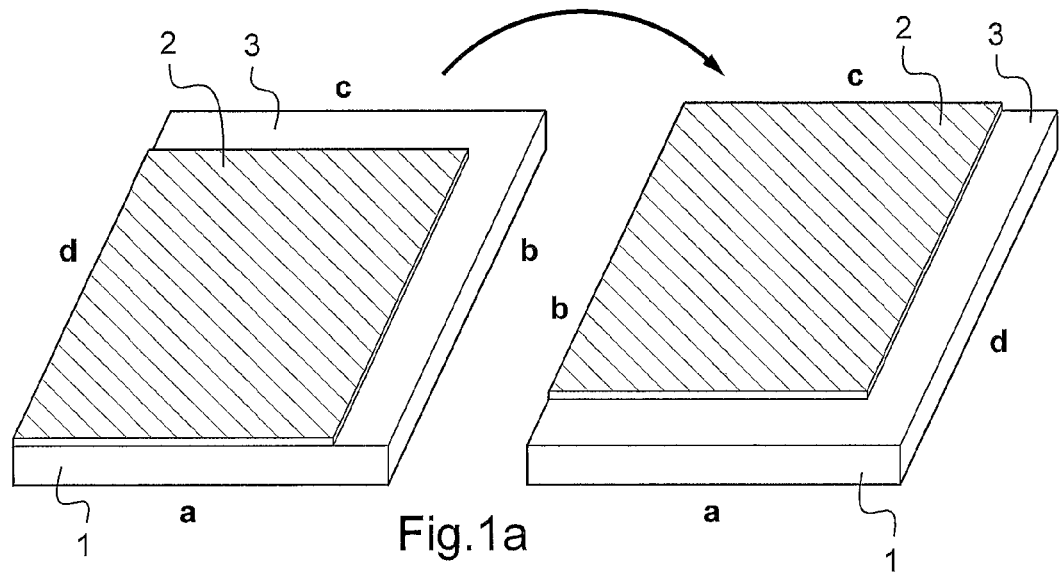
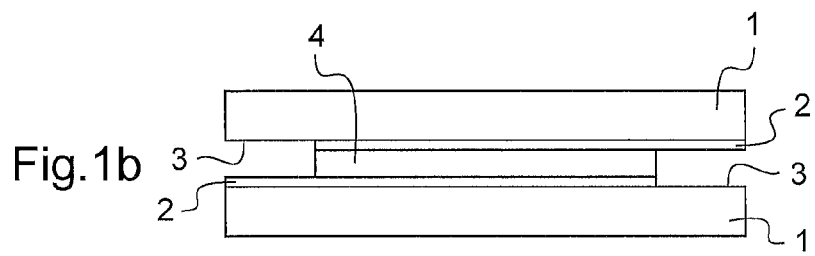
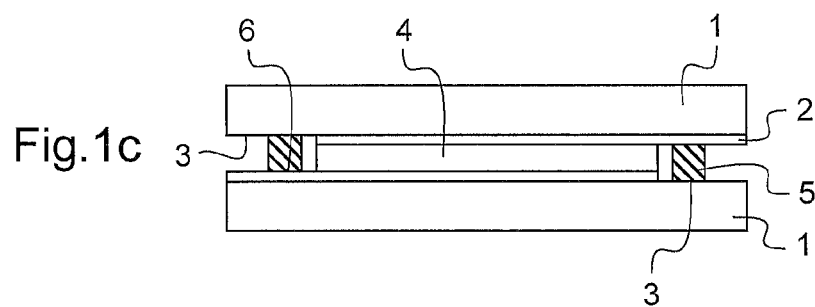
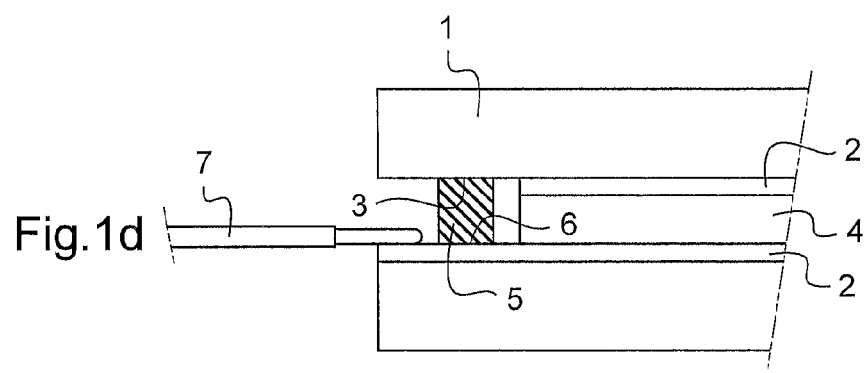
Fig.1a
Fig.1b
Fig.1c
Fig.1d

ELECTROCONTROLLABLE DEVICE

CROSS-REFERENCE TO RELATED APPLICATIONS

This application is the U.S. National Stage of PCT/FR2013/050231, filed Feb. 4, 2013, which in turn claims priority to French Application No. 1251070, filed Feb. 6, 2012. The contents of all of these applications are incorporated herein by reference in their entirety.

The present application relates to an electrically controllable device, of electrochromic type, with a peripheral seal and a system of electrodes enabling the electrical connection of the device beyond the seal and the active zone.

Electrically controllable or electroactive glazing and mirrors are formed of an active system, for example an electrochromic system, a liquid crystal system or a light-emitting system, sandwiched between two supported electrodes formed of a conductive coating on a non-conductive substrate.

Such electroactive devices may be highly sensitive to the slightest trace of water and may degrade over time if their water tightness, including water vapor tightness, is not completely ensured. The water vapor tightness of such electrically controllable devices may be ensured by various types of seals. In order to be effective, this seal must not only be intrinsically water vapor tight, but it must also adhere well to the substrates, exhibit good chemical compatibility with the active system with which it is combined and, lastly, it must be a good electrical insulator in order to avoid short-circuiting the system.

It is known to use, as a water vapor tight seal, epoxide resins and other crosslinked organic resins. However these materials are imperfect barriers to water vapor.

Polyisobutylene, whether it is thermoplastic or crosslinked owing to the presence of a crosslinking comonomer (butyl rubber), is among the best polymers in this field. Specifically it has a high impermeability to gases and an excellent resistance to aging and to corrosive chemicals. It is widely used as a seal in double glazing units and photovoltaic panels. It generally contains carbon black, which gives it its characteristic black color, but also a low conductivity. The volume resistivity of the butyl seals available on the market is around $10^8$ to $10^{12}$ Ω·cm.

This resistivity is large enough not to be an obstacle in relatively thick electroactive systems where the distance between the two conductive layers of the electrodes is at least a few hundred micrometers, or even a few millimeters.

It is only at very small thickness, that is to say below around 500 µm, that the resistance of the butyl seal becomes too low to effectively insulate the two electrodes from one another. One solution to this problem could consist in positioning the seal so that it is no longer in contact with the conductive parts of the electrodes, that is to say outside of the areas of the substrate covered by the latter. This would require however a connection of the electrodes of the electrically controllable device into the glazing, that is say into the electroactive zone confined in a leaktight manner by the seal. Such a connection is complicated for relatively thick systems, but becomes almost impossible to achieve for thin systems such as those of the present invention where the thickness of the connecting wires is often greater than the distance between the two substrates.

The Applicant has therefore tried to develop a system that allows an electrical connection beyond the zone limited by the peripheral seal. This system should moreover allow the use of a peripheral seal that has a certain electronic conductivity, such as the butyl seal filled with carbon black, even at small thickness (less than 500 µm), without the risk of a short-circuit between the two electrodes.

The present invention is based on the idea of sufficiently distancing, at the areas of contact of the peripheral seal with the support electrodes, the conductive zone or zones of the first electrode from the conductive zone or zones of the second electrode. The "sufficient" distance is of course a function of the electronic conductivity of the seal. The greater this is, the further apart the conductive zone or zones of one electrode must be from that (those) of the other.

The Applicant has observed that, for butyl seals filled with carbon black, commonly available on the market and which the Applicant wishes to be able to use, the electronic conductivity of the seals was not the cause of short-circuits from the moment when the respective conductive zones of the two electrodes were not facing one another.

Therefore, one subject of the present invention is an electrically controllable device comprising:

(a) two supported electrodes, at least one of which is transparent, which are each formed of a non-conductive substrate coated, on one of its faces, with a conductive coating, the two supported electrodes being positioned with respect to one another so that the conductive coatings are facing each other and are in contact with the electrochromic system (b), (b) an electrochromic system formed by two electroactive layers, at least one of which is an electrochromic layer, the two electroactive layers being separated by a layer of an electrolyte based on an organic polymer, the electrochromic system being sandwiched between the two supported electrodes and having an area smaller than that of each of the supported electrodes so as to define a peripheral groove over the entire perimeter of the electrochromic system, and (c) a peripheral seal made of an organic polymer that is impermeable to water vapor, said seal filling said peripheral groove over the entire perimeter of the electrochromic system and being entirely in contact both with the first supported electrode and the second supported electrode without however being in contact with the electrochromic system, said device being characterized in that the contact area between the polymer seal and the first supported electrode and the contact area between the polymer seal and the second supported electrode each comprise one or more conductive parts, where the conductive coating is present, and one or more non-conductive parts, free of conductive coating or provided with a conductive coating that is electrically insulated from the conductive coating in contact with the electrochromic system, and with the additional condition that no conductive part of the contact area between the polymer seal and the first electrode is opposite a conductive part of the contact area between the polymer seal and the second supported electrode.

In other words, a conductive part of one of the contact areas is always opposite a non-conductive part of the other contact area.

This essential condition, according to which a conductive part must never be "opposite" another conductive part—or always be "opposite" a non-conductive part—means that any straight line perpendicular to the plane of the electrodes—which are of course parallel to one another—does not cut through two conductive parts.

On the other hand, it is in no way damaging for a non-conductive part of one contact area to be opposite a non-conductive part of the other contact area.

The expression "conductive part" used in connection with the contact areas between the seal and the electrodes, denotes, in the present invention, areas where the conductive coating of the electrode is present and is in electronically conductive contact with the main zone of the conductive coating. In other words, when the device of the present invention is switched on, the conductive parts are passed through by current.

The expression "non-conductive part" used in connection with the contact areas between the seal and the electrodes, denotes, in the present application, either zones where the conductive coating is absent and where the seal is directly in contact with the non-conductive support, or zones where a conductive coating is present but is electrically insulated from the main zone of the conductive coating, that is to say from the zone of the conductive coating in contact with the electrochromic system. In other words, when the device of the present invention is switched on, the non-conductive parts of the contact area are not passed through by current, despite the optional presence of an intrinsically conductive but electrically insulated coating.

The device according to the invention comprises two supported electrodes, at least one of which is transparent. In one embodiment, both supported electrodes are transparent. The device according to the invention is then glazing, preferably electrochromic glazing.

When only one of the supported electrodes is transparent, the other electrode is preferably a reflective electrode. The device according to the invention is then a mirror, preferably an electrochromic mirror.

The transparent supported electrode(s) is (are) formed of a transparent non-conductive support, made of mineral or organic glass, coated on one of its faces with a transparent conductive coating. The mineral glass is, for example, float glass and the organic glass may be based on a polymer selected from the group formed by poly(methyl methacrylate) (PMMA), polycarbonate (PC), poly(ethylene terephthalate) (PET), poly(ethylene naphthanoate) (PEN) and cycloolefin copolymers (COC).

The transparent conductive coatings are known in the art.

They are, for example, transparent thin-film stacks comprising metallic layers, such as layers of silver, gold, platinum and copper. Or else, the conductive coating may be formed of a transparent conductive oxide (TCO) commonly used as a transparent electrode in electrically controllable devices. Mention may be made, among these TCOs, of tin-doped indium oxide ($In_2O_3$:Sn or ITO), antimony-doped indium oxide ($In_2O_3$:Sb), fluorine-doped tin oxide ($SnO_2$:F) and zinc oxide doped, for example, with aluminum or with gallium (AZO or GZO).

In one preferred embodiment of the present invention, the two supported electrodes have essentially the same shape and the same size. They can be superposed over one another with a perfect overlay, that is to say with their respective edges perfectly aligned.

This perfect superposition does not, however, correspond to a preferred embodiment of the device of the present invention. This is because, when the electrochromic system (b), sandwiched between the two electrodes (a), is particularly thin, the gap between the two electrodes may be insufficient to insert therein a current lead. It is then advantageous to offset the two electrodes relative to one another so as to make a conductive edge of each electrode readily accessible in preparation for an electrical connection.

Therefore, in one particularly advantageous embodiment of the present invention, the two supported electrodes of the device are superposed in an offset manner relative to one another so that a conductive zone of the first supported electrode and a conductive zone of the second supported electrode jut out beyond the area of overlap of the two electrodes. In the final device, each of these conductive zones is connected to an electrical connector, in other words the electrical connector is in contact with the conductive coating of the supported electrode.

This particularly advantageous embodiment where the electrodes are partially overlaid to allow good accessibility of the connection contacts will be described below with reference to FIG. 5.

The electroactive layers preferably consist of mineral materials. Mention may be made, as examples of preferred electrochromic mineral compounds, of those selected from the group formed by tungsten oxide, nickel oxide, iridium oxide, niobium oxide, tin oxide, bismuth oxide, antimony oxide and tantalum oxide.

In one embodiment, the two electroactive materials are electrochromic materials. In this case, they are generally selected so as to be colored at the same time, in other words one of the materials has anodic coloring and the other has cathodic coloring.

In another embodiment, only one of the electrochemically active mineral materials has electrochromic properties, the other having transmission properties that are independent of its degree of oxidation and simply playing the part of a counterelectrode for the electrochromic material.

Of course, the electrochromic materials may be used as a mixture with one another or, where appropriate, as a mixture with at least one metal such as titanium, tantalum or rhenium.

Use will preferably be made, as electrochromic material with cathodic coloring, of tungsten oxide, which has a blue color in the reduced state and which is colorless in the oxidized state. Tungsten oxide is often used in combination with, as an electrochromic material with anodic coloring, nickel oxide or iridium oxide.

Mention may be made, as an example of a non-electrochromic electrochemically active material, of cerium oxide.

Mention may be made, as examples of electrolytes based on organic polymers, of the electrolytes based on poly(ethylene oxide) (PEO) doped with phosphoric acid ($H_3PO_4$), the electrolytes based on poly(vinyl butyral) doped with a lithium salt dissolved in a polar organic solvent, or else ionomers, that is to say polyelectrolytes bearing sufficient covalently bonded negative charges so that their cationic conductivity, provided by the $H^+$ or alkali metal counterions, is satisfactory even in the absence of any doping agent. Mention may be made, by way of example of such ionomers, of the copolymers of tetrafluoroethylene and perfluorosulfonic acid sold under the name Nafion®.

Although the thickness of the polymer electrolyte, of the electroactive layers and of the device of the present invention are not in principle limited, it has been explained above why the sealing system of the present invention, with its particular geometry of the conductive and non-conductive zones, is particularly advantageous for devices operating with a very thin electrochromic system. Indeed, it is when the gap between the two supported electrodes is very small that the problems of the risk of short-circuits and of the insertion of current leads are faced.

In one particularly preferred embodiment of the device of the present invention, the electrochromic system, formed by the two electroactive layers and the electrolyte, consequently has an overall thickness between 50 µm et 500 µm, in particular between 70 µm and 300 µm, particularly preferably between 80 and 200 µm.

It is difficult to indicate, for the seal, a conductivity threshold beyond which the present invention is of use. Indeed, this threshold varies as a function of the thickness of the seal. The thicker the seal, the more conductive it may be without this presenting a problem.

By way of indication, the Applicant has found that the present invention is of use for seals having a resistivity of less than $10^{11}$ Ω·cm, preferably less than $10^{8}$ Ω·cm, and in particular less than $10^{5}$ Ω·cm.

The peripheral seal of the device of the present invention is preferably made of polyisobutylene filled with carbon black (butyl seal).

When a very thin butyl seal is used (thickness of less than 200 μm), the gap between the two electrodes may, in certain cases, be insufficient to prevent any risk of short-circuits. These risks are even higher since the seal is thin and since its conductivity is high. It is then recommended to move the conductive part or parts of the area of contact between the seal and the first electrode further away from the conductive part or parts of the area of contact of the seal with the second electrode. In other words, it will not be sufficient in all cases for these zones not to be opposite one another and it will be necessary to provide an additional "horizontal" offsetting, that is to say an offsetting in the direction of the plane of the electrodes. This "horizontal" offsetting is preferably of at least 100 μm, in particular at least equal to 200 μm and ideally at least equal to 500 μm.

It will be ensured that the seal is positioned so that it does not come into contact with the electrochromic system formed by the two electroactive layers and the electrolyte.

Another subject of the present invention is a process for manufacturing a device according to the present invention.

This process comprises the provision of two supported electrodes, at least one of which is transparent, which are each formed of a non-conductive substrate coated, on one of its faces, with a conductive coating. Each of these supported electrodes must comprise, at the periphery of one of its main faces, both conductive zones and non-conductive zones.

The conductive zones are the zones where the non-conductive substrate is covered with the conductive coating that extends from the center of the electrode preferably up to the edge thereof. The non-conductive zones are the zones free of conductive coating or zones where a part of the conductive coating has been insulated from the rest of the conductive coating covering the central part of the supported electrode.

FIGS. 1a-d and 2a-d illustrate these two embodiments of the non-conductive zones.

FIG. 1a shows two electrodes of rectangular shape (sides a, b, c, d) each consisting of a substrate 1 covered, over a portion of its main surface, with a conductive coating 2. The conductive coating 2 does not cover the whole of the surface of the substrate and thus leaves free a zone 3 at the edge of the substrate that extends over two sides of the rectangle. This zone 3 corresponds to what is referred to in the present application as a "non-conductive zone" or "non-conductive part". It can be obtained for example by laser ablation of the conductive coating 2. When the two electrodes are superposed in the direction of the arrow by matching up the sides that bear the same letter, the non-conductive zones 3 of one electrode are opposite conductive peripheral zones of the other electrode which is facing the first, and vice versa.

FIG. 1b is a cross section of an incomplete device where an electrochromic system 4 is sandwiched between two electrodes superposed in the manner described above. The electrochromic system has a smaller area than each of the electrodes and a peripheral groove is thus defined over its perimeter by the edges of the supported electrodes.

FIG. 1c shows the device from FIG. 1b completed by a strip of butyl seal 5 that partially fills the peripheral groove. The butyl seal 5 is placed so as not to be in contact with the electrochromic system 4.

Lastly, FIG. 1d shows an enlargement of one edge of the device from FIG. 1c. The butyl seal 5 is in contact, on one side, with a non-conductive zone 3 of one electrode and, on the other side, with a conductive zone 6 of the electrode opposite the first. An electrical connector 7 is connected to the conductive coating 2 that juts out beyond the zone delimited by the butyl seal.

FIGS. 2a-d differ from FIGS. 1a-d solely by the fact that the non-conductive zone 3 is covered, partly, with a coating 8 that is intrinsically electrically conductive but that is insulated from the rest of the conductive coating 2. When the device of the invention is switched on, only the conductive coatings 2 are passed through by a current, and not the coatings 8. The presence of the coating 8 does not consequently create a conductive zone capable of generating short-circuit problems.

Figure 3:
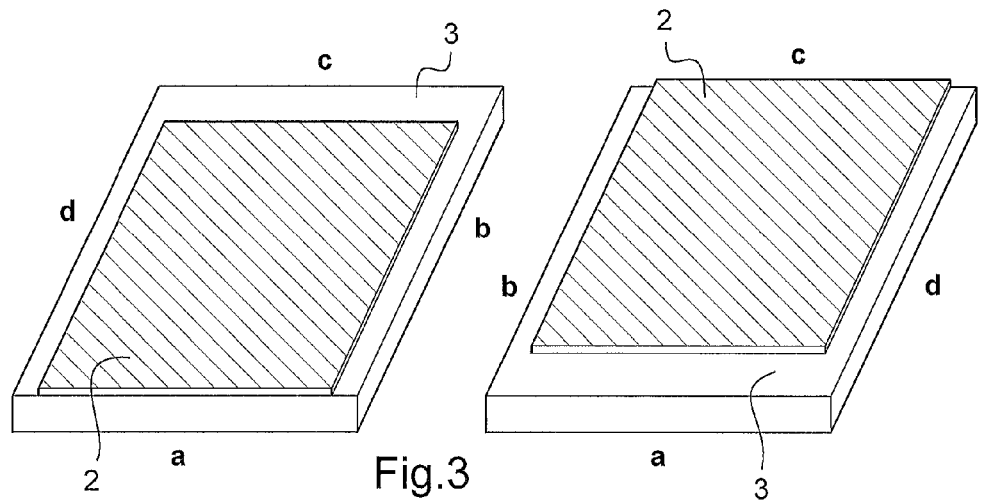
Figure 4:
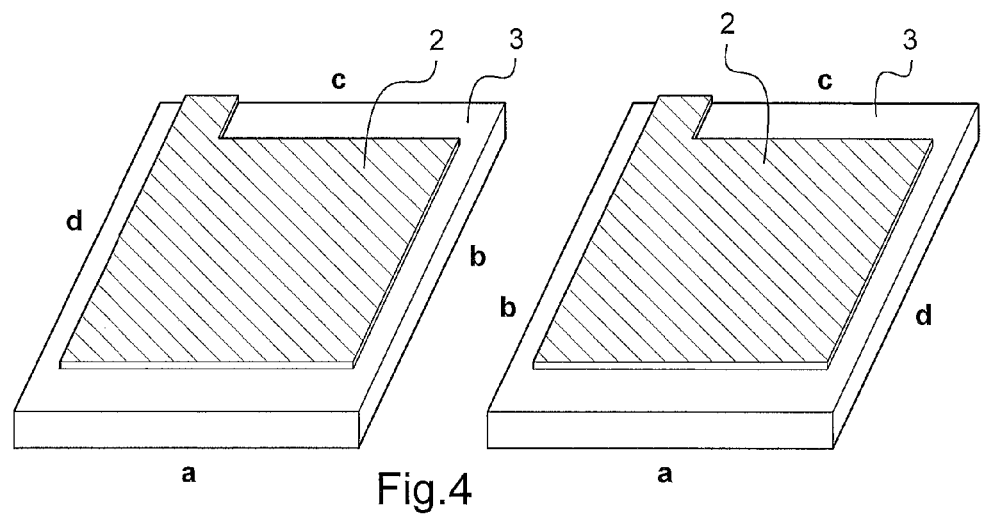

FIGS. 3 and 4 show two other geometries of conductive coatings 2 and of non-conductive zones 3 on non-conductive substrates.

In all the embodiments, it is important for the conductive coating to extend at least in a small zone up to the edge, or almost up to the edge, of the non-conductive substrate, so as to go beyond, after assembly of the device, the active (or electroactive) zone delimited by the watertight seal 5. It is at this conductive zone that the electrical connection of the supported electrodes will be made.

Figure 5:
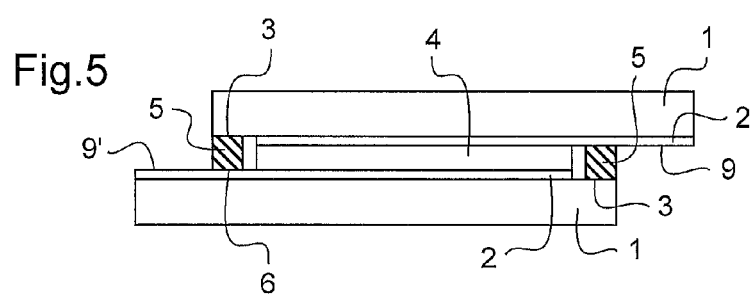

FIG. 5 shows, in cross section, one particularly preferred embodiment of the device according to the invention where the two electrodes, of identical shape and size, are superposed with an imperfect overlay, leaving one conductive zone 9,9' at the edge of each electrode without anything opposite it. This conductive zone 9,9' will be able to be used for an electrical connection with a current lead having a thickness greater than that of the seal 5, a connection which is impossible on the devices represented in FIGS. 1b-d and 2b-d.

The invention claimed is:

1. An electrically controllable device comprising:
   first and second supported electrodes, at least one of which is transparent, which are each formed of a non-conductive substrate coated, on one of its faces, with a conductive coating, the first and second supported electrodes being positioned with respect to one another so that the conductive coatings are facing each other and are in contact with an electrochromic system,
   the electrochromic system, formed by two electroactive layers, at least one of which is an electrochromic layer, which are separated by a layer of an electrolyte based on an organic polymer, the electrochromic system being sandwiched between the first and second supported electrodes and having an area smaller than that of each of the first and second supported electrodes so as to define a peripheral groove over an entire perimeter of the electrochromic system,
   a peripheral seal made of an organic polymer that is impermeable to water vapor, said seal filling said peripheral groove over the entire perimeter of the electrochromic system while being entirely in contact both with the first supported electrode and the second supported electrode without being in contact with the electrochromic system, wherein a contact area between the polymer seal and the first supported electrode and a contact area between the polymer seal and the second supported electrode each comprise one or more conductive parts and one or more non-conductive parts, and wherein no conductive part of the contact area between the polymer seal and the first supported electrode is opposite a conductive part of the contact area between the polymer seal and the second supported electrode.

2. The electrically controllable device as claimed in claim 1, wherein the first and second supported electrodes are transparent.

3. The electrically controllable device as claimed in claim 1, wherein one of the first and second supported electrodes is transparent and the other is reflective.

4. The electrically controllable device as claimed in claim 1, wherein the transparent supported electrode(s) is (are) formed of a transparent non-conductive support coated on one of its faces with a transparent conductive coating.

5. The electrically controllable device as claimed in claim 4, wherein the transparent conductive coating is a transparent conductive oxide or a transparent thin-film stack containing metallic layers.

6. The electrically controllable device as claimed in claim 1, wherein both first and second supported electrodes have essentially the same dimensions.

7. The electrically controllable device as claimed in claim 1, wherein both first and second supported electrodes are superposed in an offset manner relative to one another so that a conductive zone of the first supported electrode and a conductive zone of the second supported electrode jut out beyond an area of overlap of the two electrodes, each of the zones being in contact with an electrical connector.

8. The electrically controllable device as claimed in claim 1, further comprising an electrical connector connected to the conductive coating that juts out beyond an area delimited by the peripheral seal.

9. The electrically controllable device as claimed in claim 1, wherein the electrochromic system, formed by the two electroactive layers and the electrolyte, has an overall thickness between 50 µm and 500 µm.

10. The electrically controllable device as claimed in claim 1, wherein the seal has a resistivity of less than $10^{11}$ Ω·cm.

11. The electrically controllable device as claimed in claim 1, wherein the seal is made of polyisobutylene.

12. The electrically controllable device as claimed in claim 4, wherein the transparent non-conductive support is made of mineral or organic glass.

13. The electrically controllable device as claimed in claim 9, wherein the overall thickness is between 70 µm and 300 µm.

14. The electrically controllable device as claimed in claim 13, wherein the overall thickness is between 80 µm and 200 µm.

15. The electrically controllable device as claimed in claim 10, wherein the seal has a resistivity of less than $10^8$ Ω·cm.

16. The electrically controllable device as claimed in claim 15, wherein the seal has a resistivity of less than $10^5$ Ω·cm.

17. The electrically controllable device as claimed in claim 11, wherein the polyisobutylene is filled with carbon black.

18. An electrically controllable device comprising:
a first and a second supported electrode that are each formed of a non-conductive substrate coated on a face thereof with a conductive coating, the first and second supported electrodes being positioned with respect to one another so that the conductive coating of the first supported electrode and the conductive coating of the second supported electrode face each other, wherein at least one of the first and the second electrode is transparent;
an electrochromic system including a first and a second electroactive layer that are separated by a layer of an electrolyte based on an organic polymer, the electrochromic system being sandwiched between, and in contact with, the first and second supported electrodes and having an area smaller than that of each of the first and second supported electrodes so as to define a peripheral groove over an entire perimeter of the electrochromic system, wherein at least one of the first and the second electroactive layer is an electrochromic layer, and
a peripheral seal made of an organic polymer that is impermeable to water vapor, said peripheral seal filling said peripheral groove over the entire perimeter of the electrochromic system while being entirely in contact both with the first supported electrode and the second supported electrode without being in contact with the electrochromic system,
wherein a contact area between the peripheral seal and the first supported electrode and a contact area between the peripheral seal and the second supported electrode each comprise one or more conductive parts and one or more non-conductive parts, and wherein no conductive part of the contact area between the peripheral seal and the first electrode is opposite a conductive part of the contact area between the peripheral seal and the second supported electrode.

19. The electrically controllable device as claimed in claim 18, wherein the first and second supported electrodes are transparent.

20. The electrically controllable device as claimed in claim 18, wherein one of the first and second supported electrodes is transparent and the other is reflective.

\* \* \* \* \*